W. SMITH.
WATER-CLOSETS.
No. 183,716.  Patented Oct. 24, 1876.
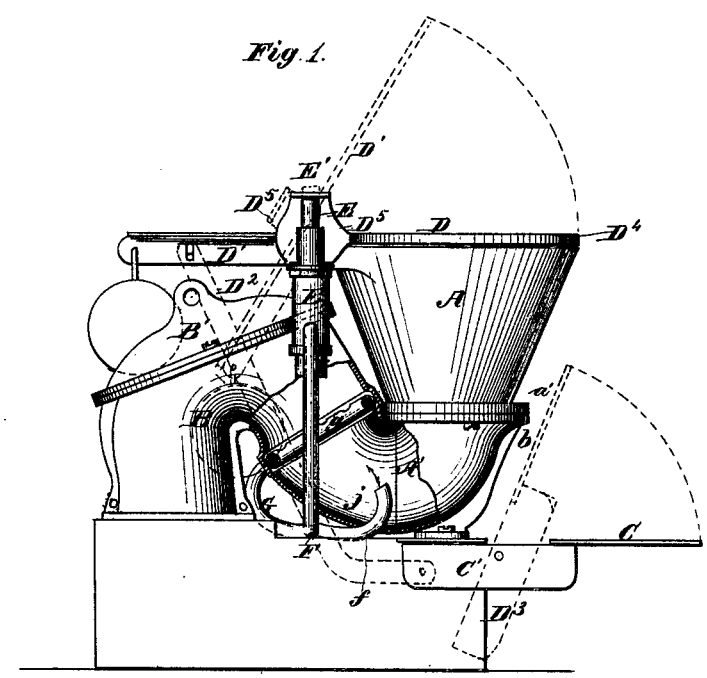
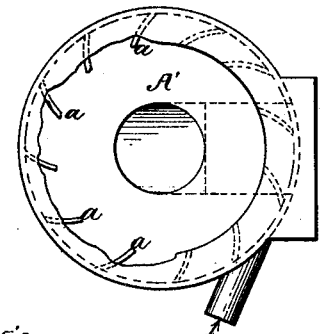
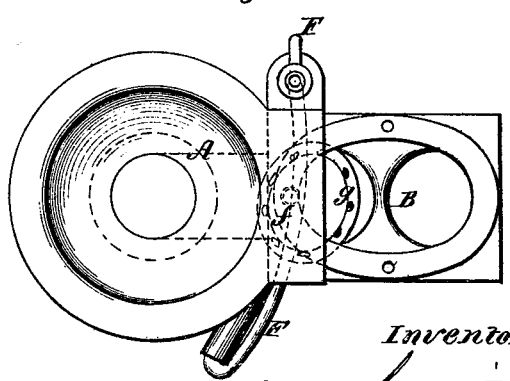
Witnesses.
E. Patten.
F. Monteverde.
Inventor.
Wm Smith
By C. W. M. Smith
Atty

UNITED STATES PATENT OFFICE.

WILLIAM SMITH, OF SAN FRANCISCO, CALIFORNIA.

IMPROVEMENT IN WATER-CLOSETS.

Specification forming part of Letters Patent No. 183,716, dated October 24, 1876; application filed May 18, 1876.

*To all whom it may concern:*

Be it known that I, WILLIAM SMITH, of San Francisco, State of California, have invented an Improved Water-Closet, of which the following is a specification:

My invention relates to an improvement in that class of water-closets that operates automatically to supply the basin with water when in use, and to shut off the flow and discharge the contents of the basin at the proper time; and it consists in certain new and improved constructions in the form of the trap and the basin, and in the combination of the jets of water therewith to properly cleanse them of their contents; also, in the peculiar self-rising seat, and in the combination, construction, and arrangement of the various parts, all as will be hereinafter more fully set forth.

The object of my invention is to discard the use of pans, gates, or plungers for retaining the water in the closet, and to retain sufficient water in the basin at such height as to give the required area to the surface of the water; also, to prevent overwash, and to thoroughly eject the contents from the basin and trap after every time of usage.

Referring to the drawings, Figure 1 is a side elevation of my improved water-closet with the side of the trap partly broken away to show the interior. Fig. 2 is a top view of the trap and basin with the hand-hole cover and hinged seat removed from their places. Fig. 3 is a top view of the basin, the rim being partly broken away to show the converging vanes on the inside.

The basin A is adapted to be used either as a water-closet or a urinal, as it is provided with a swinging seat and platform, C D. The seat is formed of metal, with a rubber rim, $D^4$, upon it, as a protector, and it is raised up from the basin when not in use by means of the weight on the end of the arm $D^1$. The hinged platform C is connected with the arm $D^1$ of the seat by means of the lever $D^2$, pivoted to it, and to the side $D^3$ of the platform, so that when the platform is depressed by the weight of the person the seat will be brought down in position upon the basin. The bottom of the basin is made with a curved lip, $A'$, that projects or dips into the trap B, being of the same curve, or nearly so, with the bottom of the trap. The rim or flange around the mouth of the basin A is formed with a series of curved converging vanes, $a\ a$, upon its inner face, whose office is to throw the stream or jet of water to the center of the basin around its sides, and thus prevent any overwash. The basin is secured to the mouth of the trap by means of its flange $a'$ and the similar flange $b$ upon the trap.

The trap B is of the S shape, and is provided with a hand-hole and plate, $B'$, of equal area with the openings of the two arms of the trap. In the space between the inlet and the discharging mouth of the trap is a small chamber, of larger diameter than the trap at this part, and in this chamber is placed an annular jet, $g$, inclined from the vertical and coinciding with the radius of the trap. This jet $g$ is composed of a circular pipe with a series of holes upon the inner side, and inclining toward the upper and discharging end of the trap. Connecting with this ring is a curved pipe, $j$, that projects into the bottom of the trap just in front of the lip $A'$ of the basin, and somewhat curved toward the back of the trap, as shown in Fig. 1. These two jets $f\ g$ are connected with the supply-valve E by means of the pipe F, and they serve to eject the contents of the basin, and insure of their being carried over into the discharging arm of the trap, and of the mouth of the basin and trap being thoroughly cleansed of their contents after each operation of the valve.

The valve E, for supplying water to the basin and trap, is of peculiar construction, and is preferably the valve for which I am about to apply for Letters Patent. This valve has a water-inlet and two outlets, one of the outlets connecting, through the pipes F, with the jets $f\ g$, for supplying water to the trap, while the other outlet supplies water to the basin through the pipe $F'$. The valve is so placed that the head $E'$ is in line with and underneath the ledge $D^5$, on the side of the hinged seat D, by which the valve is opened.

By the peculiar construction of the valve the water is not allowed to enter both the basin and trap at the same time, and is arranged so that the trap first receives the supply of water to wash and cleanse it; but as the valve rises the flow of water is turned into the outlet to the wasin, to wash it after the discharge of its contents has taken place.

As thus constructed, my closet can be used both as a water-closet and a urinal, and as each it is peculiarly adapted for public buildings, hospitals, &c.; but it can be combined with a valve having an ordinary handle, and used in private dwellings.

The metallic self-rising seat is kept clean by being held up when not in use, and by having a rubber rim impervious to or not retaining any moisture.

The form of the trap is such that the overflow of water after each wash holds the water at the mouth of the basin, and prevents the passage of any poisonous or noxious gases into the closet, while the arrangement of the jets $f\,g$ insures the effectual ejectment of the contents of the basin into the soil-pipe at each time of using.

No pans, gates, or plungers for retaining the water in the closet are necessary, and there is no drip or leakage liable to occur from any of the parts.

The arrangement of the hand-hole and plate, having double the area of the soil-pipe, allows it to be cleansed out whenever required.

Having thus fully described my invention, what I claim, and desire to secure by Letters Patent, is—

1. In a water-closet or urinal without pans or gates, the combination of a jet or jets for cleaning the basin, and the two jets $f\,g$, for ejecting the contents of the trap and basin, substantially as described and shown.

2. In a water-closet, the combination of the self-rising seat D and the swinging platform C, connected together by a lever or levers, when the said seat and platform are adapted to rise automatically, and to be lowered simultaneously, substantially as described and shown.

3. In a water-closet, the combination of the S-shaped trap B and the hand-hole and plate B', of equal area with the openings of the two arms of the trap, substantially as described and shown.

4. The basin A, with the curved lip or inlet A', constructed to enter the trap B, as described and shown.

5. The combination and arrangement, with the valve E, for water-closets, of the pipes F F' and jets $f\,g$, constructed and applied as shown and described.

In testimony that I claim the foregoing I have hereunto set my hand and seal.

WM. SMITH. [L. S.]

Witnesses:
C. W. M. SMITH,
PHILIP MAHLER.